(12) United States Patent
Sanz et al.

(10) Patent No.: US 6,230,784 B1
(45) Date of Patent: May 15, 2001

(54) ELECTRICALLY OPERATED AIRCRAFT WINDOW WITH A SLIDING TAKE-UP SPOOL

(75) Inventors: Eduardo Sanz; Donald Martin; Gilbert Moreno, all of San Antonio, TX (US)

(73) Assignee: MSA Aircraft Products Ltd., San Antonio, TX (US)

( * ) Notice: Subject to any disclaimer, the term of this patent is extended or adjusted under 35 U.S.C. 154(b) by 0 days.

(21) Appl. No.: 09/159,950

(22) Filed: Sep. 24, 1998

Related U.S. Application Data

(60) Provisional application No. 60/060,049, filed on Sep. 25, 1997.

(51) Int. Cl.[7] ....................................................... E06B 3/94
(52) U.S. Cl. .................................... 160/84.02; 160/171 R
(58) Field of Search ............................. 160/84.02, 265, 160/84.01, 84.04, 84.05, 171 R, 170 R

(56) References Cited

U.S. PATENT DOCUMENTS

| | | | |
|---|---|---|---|
| 4,679,610 | 7/1987 | Spraggins | 160/107 |
| 4,726,410 * | 2/1988 | Fresh | 160/171 R |
| 4,998,576 | 3/1991 | Moreno | 160/90 |
| 5,070,927 * | 12/1991 | Chen | 160/171 R X |
| 5,082,043 | 1/1992 | Moreno | 160/90 |
| 5,103,888 * | 4/1992 | Nakamura | 160/171 R |
| 5,178,200 * | 1/1993 | Hagen | 160/84.02 X |
| 5,318,090 * | 6/1994 | Chen | 160/171 R |
| 5,515,898 | 5/1996 | Alcocer | 160/84.02 |

* cited by examiner

Primary Examiner—David M. Purol
(74) Attorney, Agent, or Firm—Jackson Walker LLP

(57) ABSTRACT

An electrically driven motor capable of smoothly and efficiently raising and lowering a shade of an aircraft window. The aircraft window includes a spool which can slide axially. A cord is tied to one end of the spool, routed around the frame of the window and back to the second end of the spool. Between the first and second ends of the cord, it is tied into a shade rail. The shade rail is attached to the shade and when the shade rail moves up and down, the shade opens and closes. The spool is energized by the electric motor and, when moving in the first direction, causes one end of the spool to take up cord, thus causing the shade rail to move up and the other window to open and, when the electric motor is reversed, the take-up side of the spool becomes the unwind side and the unwind side becomes the take-up side, with the shade moving towards a closed, or down, position.

6 Claims, 8 Drawing Sheets

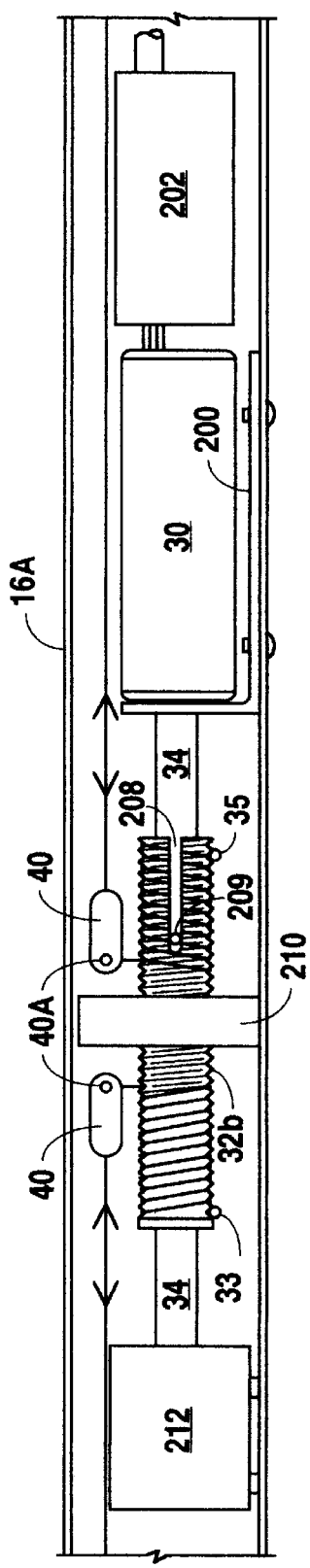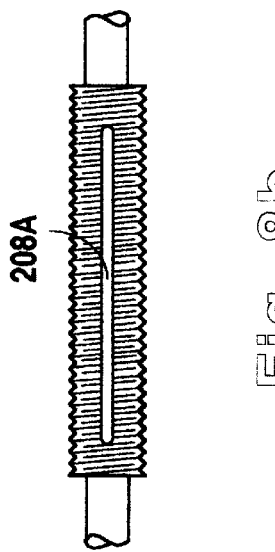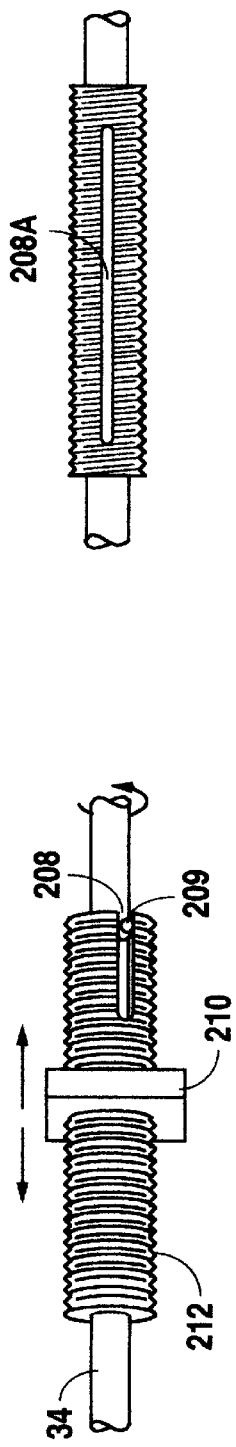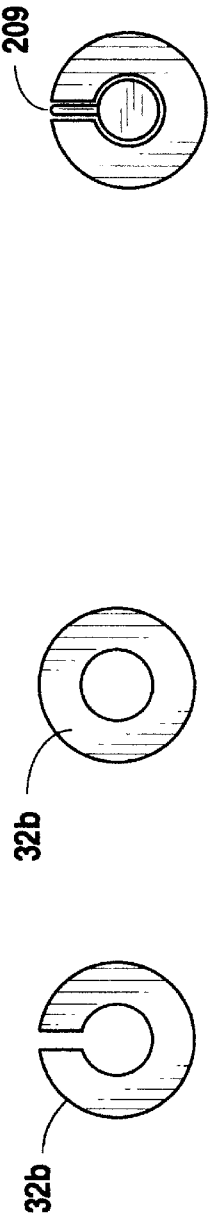

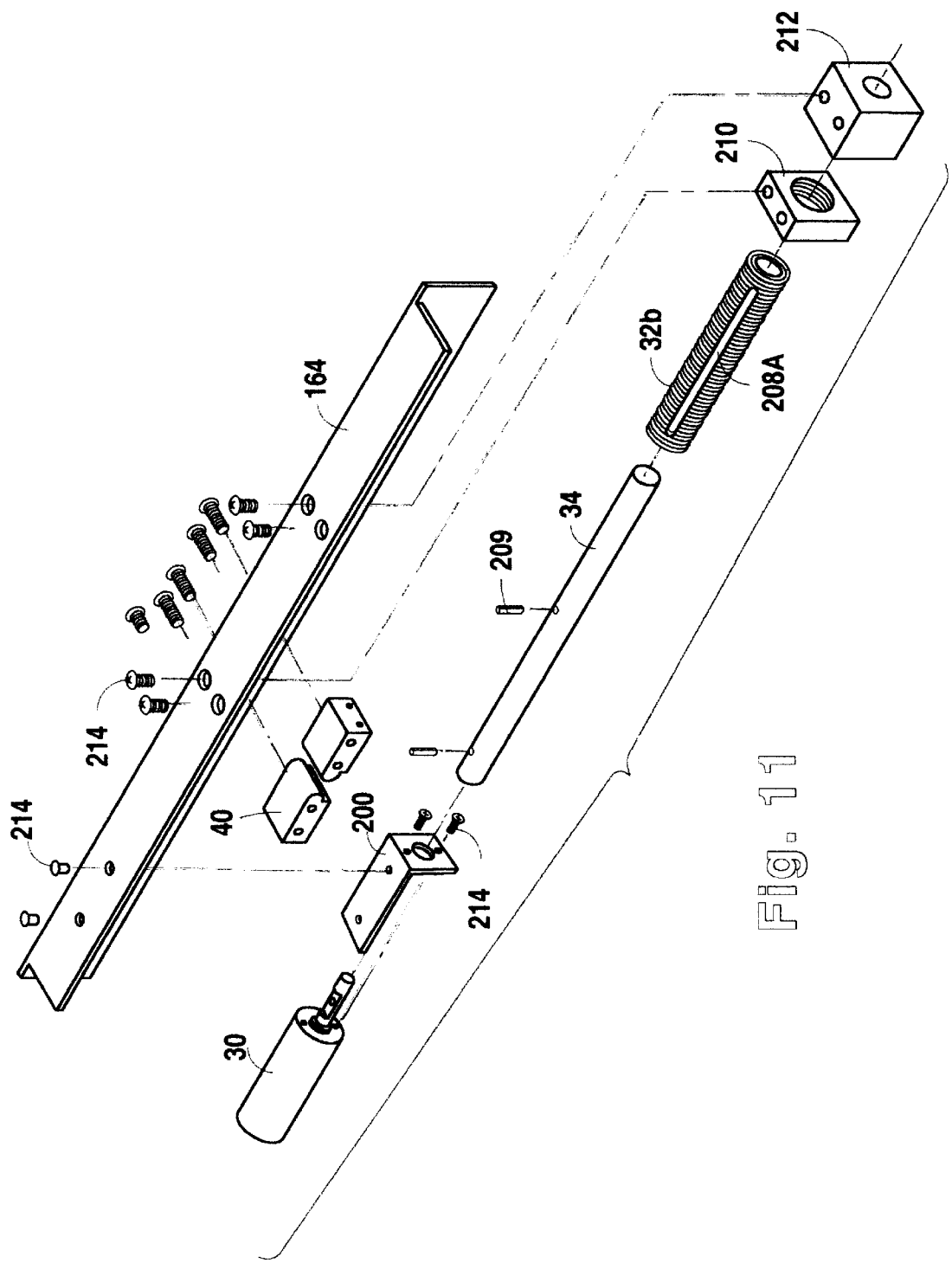

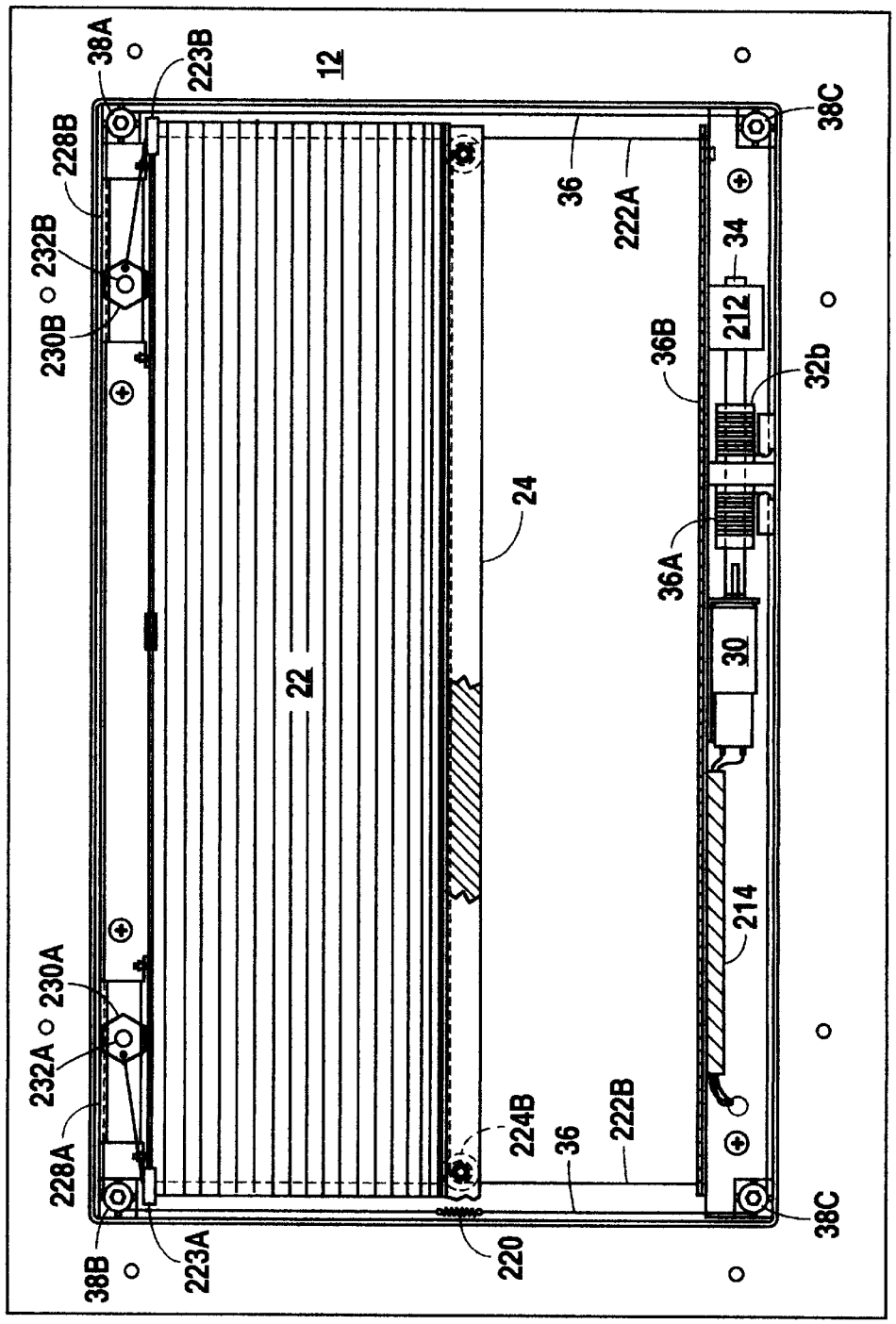

ELECTRICALLY OPERATED AIRCRAFT WINDOW WITH A SLIDING TAKE-UP SPOOL

This application claims priority on Provisional Application No. 60/060,049 filed Sep. 25, 1997.

FIELD OF THE INVENTION

Applicants' invention relates to aircraft windows, more specifically an aircraft window being electrically powered through a duplex pulley or a longitudinally slideably or positively-driven spool to move a shade between an open and closed position.

BACKGROUND OF THE INVENTION

Presently, aircraft windows are provided in modular form for retrofitting into existing jet aircraft or finishing out newly manufactured aircraft. Because of the unique demands of the aircraft's operating environment, the aircraft windows must be lightweight, compact, modular, easy to assemble, durable and have few parts.

Typically, present aircraft windows either are electrical powered off the aircraft's electrical system, or are manually operated by the passenger. The shades are raised between an upper and a lower position. Many of the aircraft are presently fitted with shades located between an outer and an inner pane such that the aircraft passenger does not have access to direct contact with the shade itself and raising and lowering the shade must be affected through either a control switch engaging and disengaging the electric motor or, in the case of a manually operated window, a lever which is manually positioned by the passenger and operates through an engagement means to engage the window shade for positioning between an upper and lower (open or closed) position.

Turning now to this latter type of aircraft window, that is, one with the shade located between a pair of lenses, there is a demand for such aircraft windows where the vertical axis of the window is greater than the horizontal axis of the window. Thus, shade raising between the upper and lower position in the vertical plane is required to have a mechanical advantage in the actuation means when the manual external control lever slides horizontally.

Assignee to the present invention is also assignee of U.S. Pat. No. 5,082,043 (Moreno 1992) which addresses just such a problem. The specification and drawings of the '043 patent are incorporated herein by reference. This patent addresses the need for the actuation means to have a mechanical advantage in the vertical or the "narrow" windows. With the wide windows, wherein the horizontal axis is equal to or greater than the vertical axis, the throw of the manual control lever can be linear with respect to the distance the shade moves. That is, there may be a direct actuation—one-to-one—without the need for a mechanical advantage.

Applicant addresses, in the various embodiments of the aircraft window illustrated, described and claimed herein two problems heretofore unsuccessfully or not addressed by others in the market. First, Applicant provides a means for engaging an electric motor through a unique pulley system, to a shade to smoothly raise and lower the shade in a window that is light, compact, modular, has few parts and is easy to assemble. Second, Applicant provides a modular window with all of the aforementioned qualities which has a manual override wherein a passenger is capable, in the event of motor failure, of moving the shade with a manual lever, through an actuation means which provides a mechanical advantage allowing the shade rail to be moved a distance greater than that of the manual lever.

This latter problem, that is, the use of a handle or manual lever overdrive in a narrow window, has not heretofore been successfully addressed in the prior art. Applicants' novel solution to this problem, typically but not necessarily in conjunction with an electrical motor having either a duplex pulley or an axially slideably spool, provides for a unique combination of elements heretofore unavailable in a modular, lightweight aircraft window.

Thus, it is an object of Applicants' present invention to provide for an aircraft window driven through an electric motor connected to the aircraft power system and controlled by a passenger/operator control switch, which control electric motor engages the shade to move the shade of the aircraft window between an open and closed position through utilizing either a duplex pulley or a longitudinally sliding spool and a single drive cord operating through a series of fixed pulleys and tied into a moveable shade rail.

It is further object of Applicants' present invention to provide a motor for moving a shade between an open and close position, the motor operating a spool that is movable axially either positively or under the impetus of the cord itself as the cord is wound and unwound from the spool, thus preventing the cord from bunching up in any one spot.

It is an object of the present invention to provide a novel electrically driven motor capable of smoothly and efficiently raising and lowering a shade of an aircraft window.

It is another object of the present invention to provide for an electrically operated aircraft window having an electric motor with a manual override in case of a power failure.

It is another object of the present invention to provide for an electrically powered aircraft window with a manual lever operating the shade through an actuator system producing a mechanical advantage which in turn acts as a manual override to an electric motor which normally operates the window shade through a passenger operated switch.

SUMMARY OF THE INVENTION

In satisfaction of these and related objectives, Applicants' present invention provides in an aircraft window, typically having a frame with a multiplicity of frame members, an outer lens and inner lens mounted on the perimeter of the frames an electrically operated shade movable between an open and closed position, the shade driven by either a duplex pulley or a slideably spool through a system of perimeter pulleys engaging a drive cord, the drive cord attached to a moveable shade rail for moving the shade between an open and closed position.

Applicants' objectives are readily provided for in this system further comprising a handle operating in conjunction with the electric motor to provide a manual override in the event of motor failure, which handle provides a mechanical advantage when operating the shade moveable between an open and a closed position.

The Applicants also provide an electrically-driven spool, for simultaneously winding and unwinding a cord, the cord operating the raising and lowering of the window shade, so as to prevent the cord from bunching up as it's wound on to the pulley by providing in this system either a free sliding member or a positively-driven member driven by the electric motor, the member capable of moving axially as the cord is wound and unwound from the pulley mechanism.

BRIEF DESCRIPTION OF THE DRAWINGS

FIG. 8 is a side elevational view of the threaded spool and rifled block, showing how the combination of a pin on the shaft allows the threaded spool to move axially on the drive shaft.

FIGS. 8A–B is a side elevational view of another pin, slot, drive shaft and threaded spool combination featuring a closed slot.

FIG. 9A is a cross sectional view of the threaded spool through the slot portion.

FIG. 9B is a cross sectional view of the threaded spool in a nonslot portion thereof.

FIG. 10 is a cross sectional view showing how the pin of the drive shaft engages the slot of the threaded spool.

FIG. 11 is an exploded view of the manner in which Applicants' alternate preferred embodiment is assembled.

FIG. 12 is a side elevational view of the window shade showing how it is driven up and down as the threaded spool simultaneously takes up cable on one end and unwinds it from the other as the threaded spool moves axially.

DETAILED DESCRIPTION OF THE PREFERRED EMBODIMENT

Figure 1:
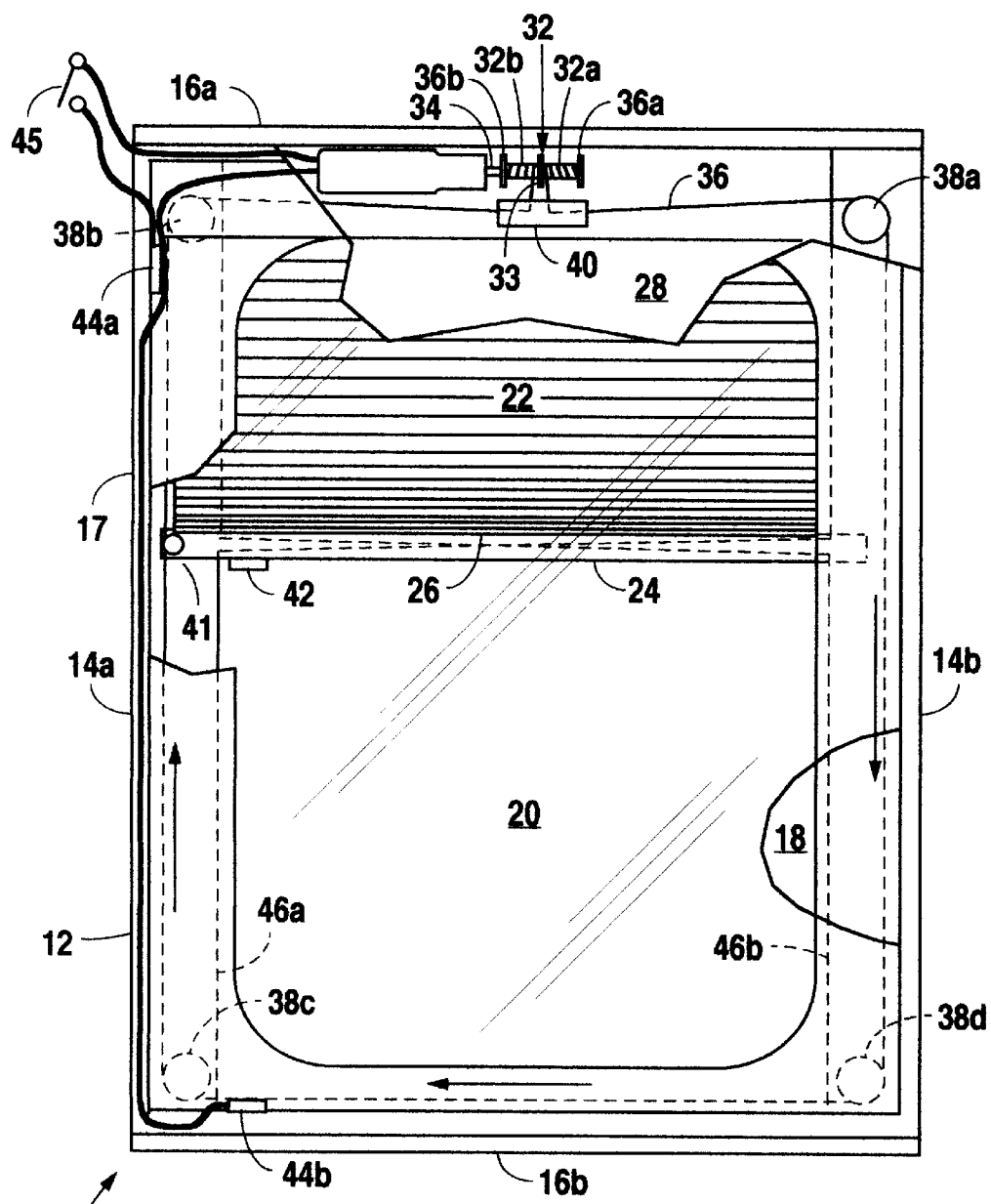
FIG. 1 illustrates a rear elevational view of the aircraft window of Applicants' present invention.

As can be seen in FIG. 1, Applicants' aircraft window (10) is comprised of a generally rectangular frame (12), the frame typically being comprised of two side frame members (14a) and (14b) and a top and a bottom frame member (16a) and (16b) respectively. Preferably, the frame members are attached at their ends in generally perpendicular relation to form a rectangular perimeter (17). Mounted to the frame at the perimeter thereof is an outer lens (18) and an inner lens (20). The two lenses are spaced apart by their attachment to frame (12) and typically lay in general parallel relation. Frequently, frame (12) and lenses (18) and (20) are slightly curved such that they fit flush with the outer surface or adjacent to an outer surface of a fuselage of an airplane.

Some of the space between outer lens (18) and inner lens (20) is taken up by a shade (22) having a lower shade rail (24) at a removed end (26) thereof. Shade (22) has a near or proximal end attached typically to top frame member (16a). As can be seen in FIG. 1, shade (22) is attached to the frame at top frame member (16a). Shade (22) is collapsible or retractable and capable of moving between an open position, generally allowing light to pass through the lenses and a closed position which substantially prevents light from passing through the lenses.

Figure 2A:
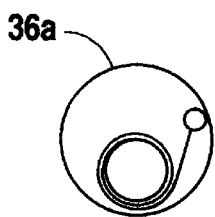
FIGS. 2A and 2B illustrate side elevational views of the first section and the second section of Applicants' duplex pulley.
Figure 2B:
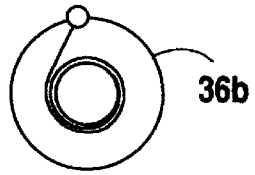

An attached end (28) of the shade is fixed to the frame, whereas a removed end (26) of the shade slides up and down as viewed in FIG. 1. An electric motor (30) is used to power shade (22) between the open and closed position. More specifically, motor (30) has a drive shaft (34) to which is attached a rigid spool or duplex pulley (32). As seen in FIGS. 1, 2a, and 2b, pulley (32) has a first pulley section (32a) and a second pulley section (32b), the two sections separated by pulley wall member (33). Motor (30) is capable of rotating pulley (32) selectively in both a clockwise or counter clockwise direction. Pulley (32) has a single loop drive cord (36), typically woven nylon, with both ends attached thereto. The drive cord has a first end (36a) and a second end (36b) and engages a number of corner pulleys (38a)–(38d) and a guide block (40) as set forth in FIG. 1 and set forth in more detail below, to move lower shade rail (24) between the open and the closed position. That is, first end (36a) of drive cord (36) is attached to first section (32a) of pulley (32) by tying or the like. Drive cord (36) is then routed through guide block (40) where it undergoes a change of direction trending outboard to corner pulley (38a) downward to corner pulley (38d) across the bottom of window (10) to corner pulley (38c) and upward to corner pulley (38b) where it returns to second section (32b) of pulley (32) by routing through guide block (40). Before attachment to second section (32b), drive cord (36) is wound around second section (32b) in a direction opposite the winding of drive cord around (32a). Details of this reversed winding are provided in FIGS. 2a and 2b. Drive cord (36) is tied into lower shade rail (24), here at attachment point (41). Thus, when motor (30) is energized, one of spool or pulley sections (32a) or (32b) will be a take up pulley and the other of sections (32a) or (32b) will be a feed pulley. With drive cord (36) tied into (41), energizing motor (30) will raise or lower shade (22) by moving lower shade rail (24).

FIG. 1 also illustrates the use of permanent magnet (42) typically attached along the lower shade rail (24) for engagement with either of magnetic pick-ups (44a), located adjacent lower shade rail (24) when the lower shade rail is at the open position adjacent frame member (16a) or magnetic pick-up (44b) when the lower shade rail (24) is adjacent bottom frame member (16b). Upper and lower magnetic pick-ups (44a) and (44b) respectively are wired up to external control switch (45) and motor (30) to control the movement of lower shade rail (24) between the open and closed position. More particularly, when motor (30) is energized by passenger controlled external control switch (45) and is moving towards either of the open or closed position, when it arrives adjacent either of upper or lower magnetic pick-up switches (44a) and (44b) respectively, it will automatically be de-energized with the control module switching the direction of rotation of the motor.

FIG. 1 also illustrates one manner in which Applicants' invention maintains proper alignment between lower shade rail (24) and frame (12). That is, lower shade rail (24) must move up and down between the open and closed position without getting caught sideways or otherwise out of alignment with respect to the frame. This would prevent the smooth functioning of the shade as it moves between an open and closed position, possibly causing it to bind, lock up or otherwise jam as it rides between the upper and lower positions.

Applicant maintains alignment by utilizing first and second fixed alignment cords (46a) and (46b) respectively. As can be seen in FIG. 1, both first and second fixed alignment cords have a first end and a second end respectively. The first ends thereof are attached at or near top frame member (16a)

near the outer ends thereof. From this position, first and second fixed alignment cords depend vertically towards bottom frame member (16b). However, when they reach lower shade rail (24) they are routed through the lower shade rail and criss-cross underneath it as illustrated in FIG. 1, where they are rerouted to trend vertically downward along essentially the same path as the upward portion to be fixed under tension to bottom frame member (16b) out the outward ends thereof.

Figure 3:
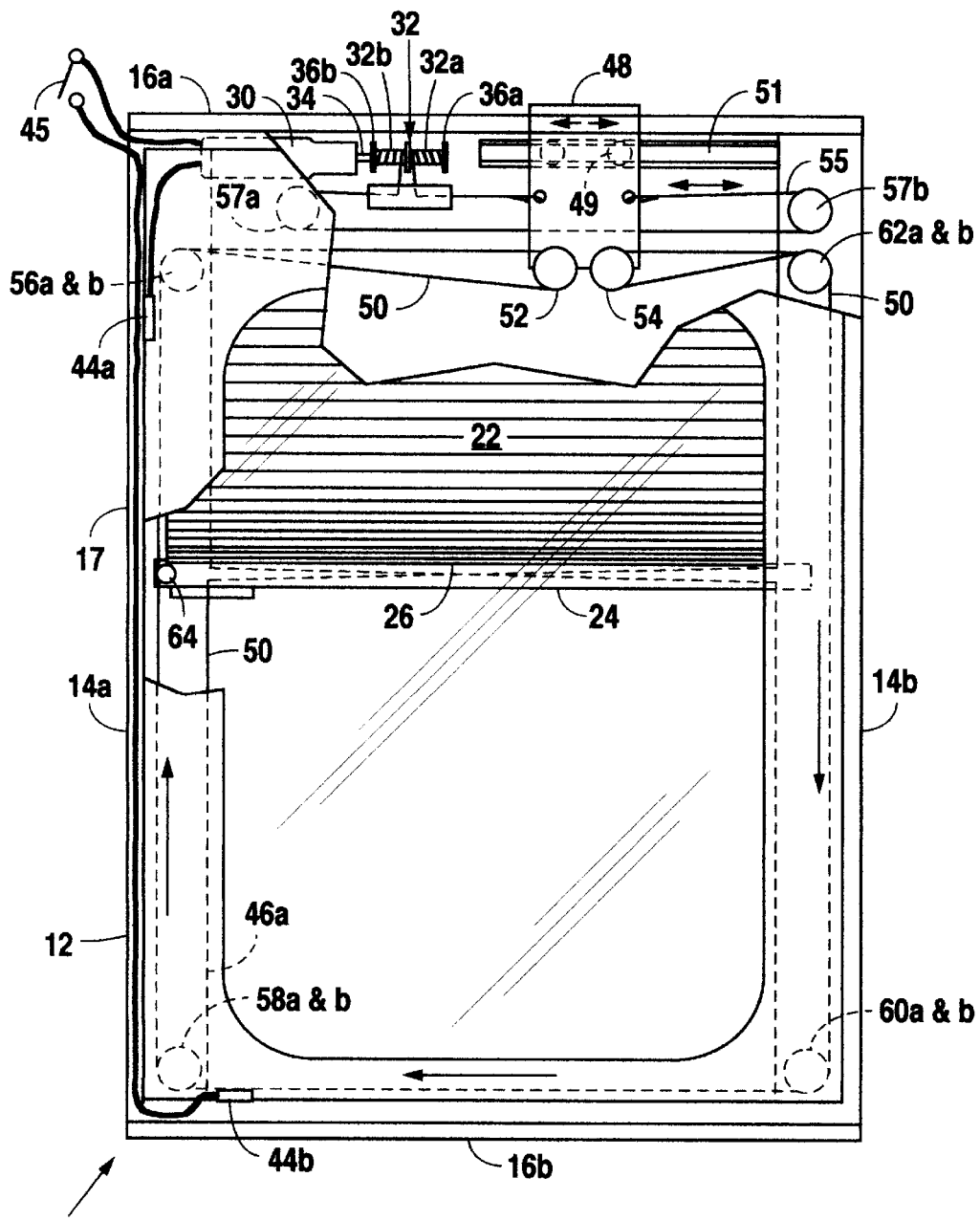
FIG. 3 illustrates a rear view of Applicants' perimeter pulley system working together with the duplex pulley and a handle for manual override.

FIG. 3 illustrates a second embodiment of Applicants' present invention in which an electric motor, designed to move a shade rail between an open and closed position has a mechanical override with a handle (48). Thus, if the electric motor were to fail, a passenger could utilize the mechanical override to move the shade up or down.

Thus, FIG. 3 illustrates override handle (48) movable on rollers (49) back and forth horizontal with frame member (16a) for engagement of rollers (49) with slot (51) (typically formed from aluminum "C" channel).

Figure 4:
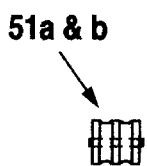
FIG. 4 represents a slide elevational view paired pulley used in Applicants' invention.

More specifically, FIG. 3 illustrates the use of override handle (48) capable of moving shade (22) up and down by engagement of lower shade rail (24) with actuator cord (50). More specifically, actuator cord (50) is a closed loop tied in at tie point (64) on an edge of lower shade rail (24). Actuator cord (50) is threaded through a pair of handle-mounted moveable pulleys and a set of four, fixed, corner mounted pulley sets (see FIG. 4). The corner pulleys are paired as illustrated in FIG. 4, (51a) and (51b) representing a side view of any one of the four pulleys comprising the actuator means for raising and lowering lower shade rail (24). In particular, handle (48) is illustrated having mounted on a rear surface thereon, moveable pulleys (52) representing a first moveable pulley and a second moveable pulley, respectively. The moveable pulleys are mounted to override handle (48) on axles (not shown).

To more specifically illustrate the arrangement of the pulleys and actuator cord (50), let's start arbitrarily at tie in point (64) and follow activator cord (50) downward therefrom. It is seen that activator cord engages (58a) and undergoes a change in direction across the bottom of the window to pulley (60a) then upwards to (62a) and around (54) to pulley (62b) downward around pulley (60b) across and around the bottom again to pulley (58b) upwards to pulley (56b) and across pulley (52) and back around pulley (56b) to tie in at tie in (64).

The preferred dimensions of the aircraft window embodying the present invention include thickness of frame members 0.5 inch to 1.5 inches; duplex drive pulley diameter 0.25 inch to 1.5 inches.

Thus, it is seen how a system of two moveable pulleys, four fixed pulley sets and actuator cord (50) provide a mechanical advantage to the system by multiplying the distance handle (48) moves horizontally to find the distance moved vertically by lower shade rail (24). That multiple or mechanical advantage, allows the use of a horizontal handle to move a shade vertically on a narrow window. The addition of electric motor (30) operating through a duplex pulley (32), fixed pulleys (57a) and (57b) and cord (55) attached to a portion of handle (48) allows electric motor to move the lower shade rail up and down by moving the handle back and forth. If electric motor (30) fails, a passenger moving handle (48) horizontally would directly engage moveable pulleys (52) and (54) and actuator cord (50) to engage lower shade rail (24) and move shade (22) between an open and closed position.

Figure 5:
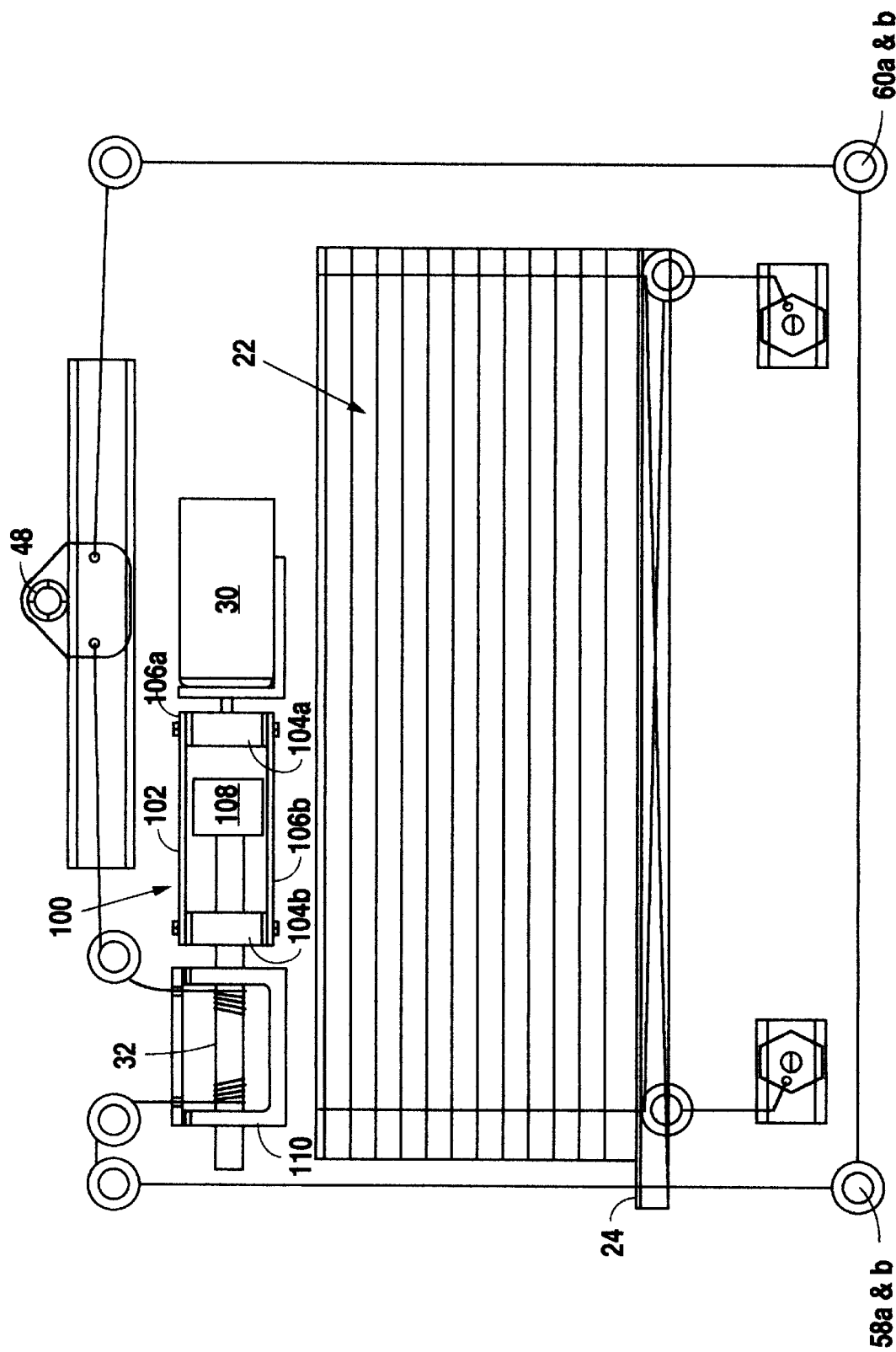
FIG. 5 illustrates an alternate preferred embodiment of Applicants' present invention wherein spool (32) is capable of sliding axially as the cord winds and unwinds therefrom during operation of motor (30) or the overdrive handle.
Figure 6:
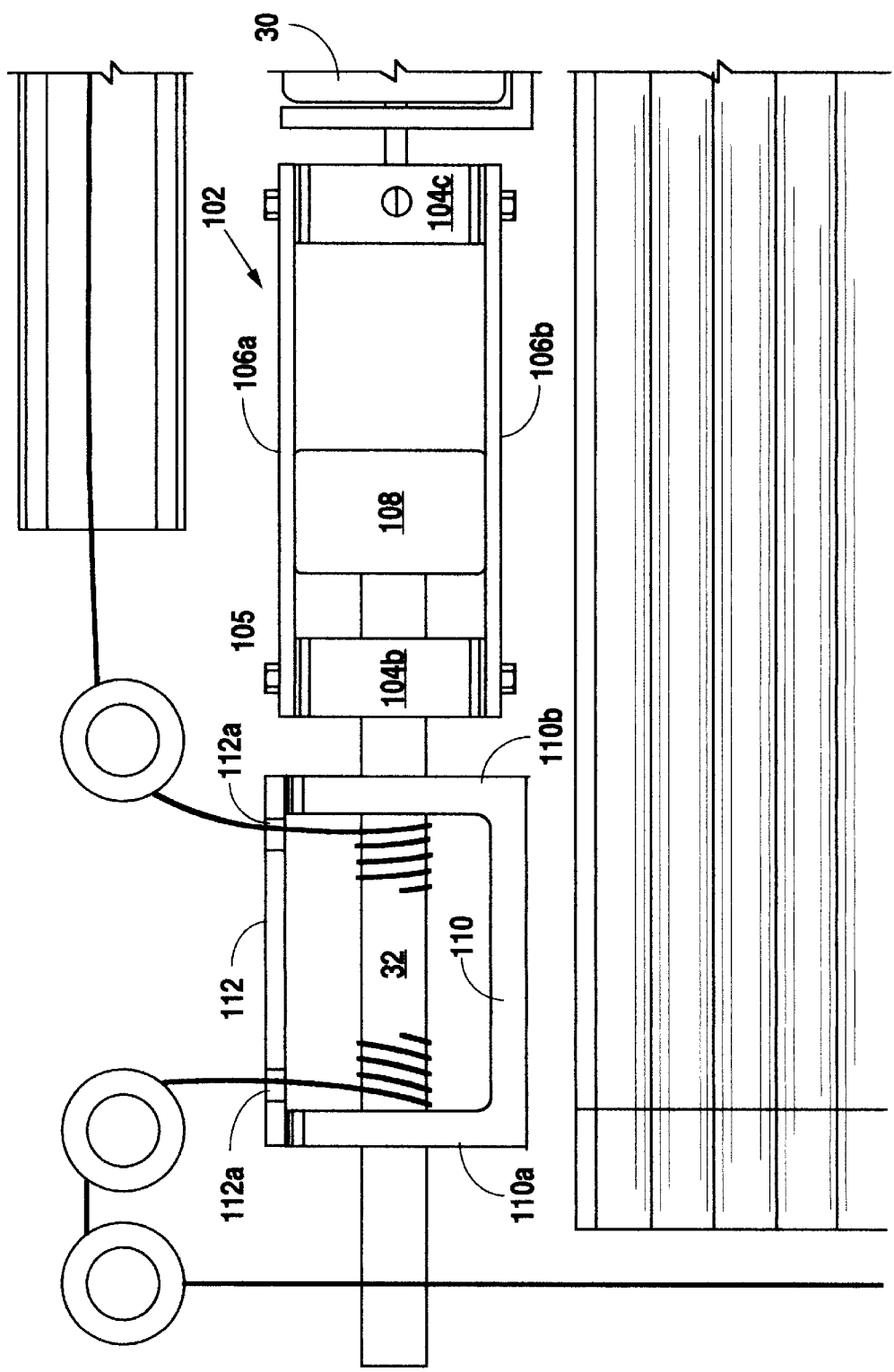
FIG. 6 is a rear side elevational view of the free sliding take-up spool of Applicants' present invention removed from the remainder of the window.
Figure 7:
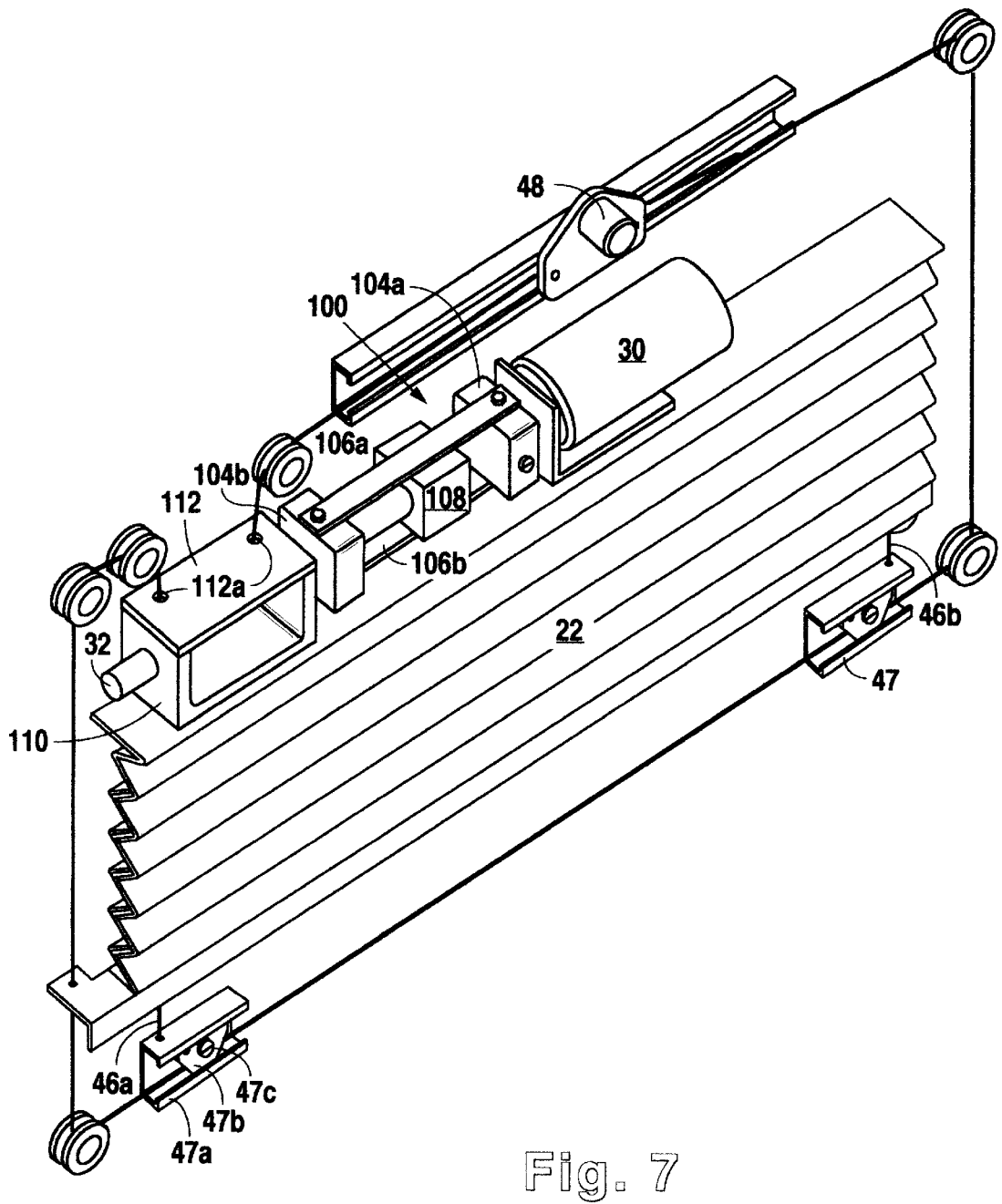
FIG. 7 is side perspective view of the sliding spool drive embodiment of Applicants' present invention, without showing the frame, windows and some of the other elements of the window.

As can be seen with reference to FIGS. 5 through 7, Applicant provides an alternate preferred embodiment of the present invention. In the preferred embodiment referenced in FIGS. 5 through 7, it is seen that Applicant countenances the problem occurring when the cord, being wound on to the duplex pulley or spool may bunch up or wind on top of itself. When this occurs, one rotation of the spool winds up more cord on take-up than it releases on unwind. This can stress the cord. Therefore Applicants' provide in the alternate preferred embodiment illustrated on FIGS. 5 through 7 a sliding spool (32) which is engaged to a spool drive and slide unit (100). Functionally, spool drive and slide unit (100) is driven by the motor, which does not directly engage spool (32). Instead, motor (30) is attached to cage (102) at the near end thereof. Cage (102) is typically rectangular and includes block-shaped end members 104a and 104b on either end thereof. Found in end member 104b is hole (105) shaped to allow shaft of sliding spool (32) to slide therethrough. Cage (102) is also seen to have side members (typically two) mounted opposite to one another, the side members (106a) and (106b) snugly contain therebetween slide block (108). Slide block (108) is attached to near end of spool (32) which extends through hole (105) in the spool shaft holes in upright portions (110a) and (110b) of end member (104b). Spool (32) also extends through holding bracket (110) which is typically attached to the frame or other structural element of the window. Holding bracket 110 may also have wall 112 on an end thereof with guide holes 112a therethrough to allow the cord access to the spool. Holes 112a are typically aligned over spool (32). Energizing motor (30) will cause spool (32) to rotate yet slide freely as cord from the take-up side winds up and cord from the release side unwinds. Thus it is seen that, as compared to a rigid spool (meaning a spool that does not slide axially) this alternate preferred embodiment will prevent the "bunching up" of cord on the spool as it is taken up.

The illustration in FIG. 7 provides for a handle to be spliced into the drive cord as a mechanical override in the event the motor fails. There is no mechanical advantage in this particular embodiment and the handle rides in "C" section aluminum channel on rollers. Shade leveling adjusters are also featured in FIG. 7, but are separate and apart from the drive cord. The shade-leveling adjusters are used in connection with the shade alignment illustration discussed with respect to FIG. 1. That is, the ends of the first and second alignment cords (46a) and (46b) have second ends tied into the shade-leveling adjustments as illustrated in FIG. 7. Shade-leveling adjusters (47) are comprised of short sections of "C" channel aluminum attached to a frame member and which rides, captured between the arms of the "C," a plate (47b). Threaded through a central portion of the plate is locking bolt (47c). Tying in the second ends of the cords into the plate and sliding the plate longitudinally across the "C" channel until the proper tension is required, then backing the plate out against the arms of aluminum channel, allows one to adjust the tension in the shade-leveling mechanism.

FIGS. 8–12 illustrate yet another alternate preferred embodiment of Applicants' present invention. This alternate preferred embodiment provides additional advantageous features. As noted with respect to FIGS. 5–7 above, a spool can be provided that slides axially typically along an axis coincident with the drive shaft of the motor. Providing for such a feature overcomes the problem of a rigid (nonsliding) duplex pulley or spool causing the takeup cord to "bunch up". In the alternate preferred embodiment provided in FIGS. 5 through 7 above, the spool is capable of sliding freely as the cord being taken up interferes with the previously wound cord. In the instant embodiment of the sliding spool, however, the spool is provided with a drive force to positively move the spool axially which does not depend on take-up cord interference and further provides grooves into which the taken up cord can lay, which grooves are separated from previously wound throws.

This result is accomplished by using a threaded spool (such as the threaded shaft of a bolt) which has been bored out to allow it to slide over a shaft. The threaded spool has an alignment pin-and-groove mechanism and is driven through a rifled drive block in the manner set forth more fully below.

FIGS. 8 through 11 illustrate the alternate preferred embodiment of Applicants' present invention featuring a positively driven spool. With reference to the figures, it may be appreciated that there are some common elements to this alternate preferred embodiment and the earlier presented embodiments. Here, Applicants provide motor (30) attached by bracket mount (200) or other means to a frame member (16a). Motor (30) drives a drive shaft (34) which typically has a drive shaft support block (212) at the removed end thereof which helps keep the drive shaft properly aligned during use. Further, the instant embodiment features cord guide blocks (40) which will position the cord properly above a take-up/unwind point on the two opposed end sections of a threaded spool (32b). Threaded spool (32b) is typically nylon and differs from the previous embodiments in that it has a hollowed-out core and fits slideably over drive shaft (34). Cut through the walls of threaded spool (32b) is a slot (208). A pin (209) dimensioned to fit snugly and slideably adjacent the walls of the slot is anchored into drive shaft (34). Last, a rifled drive block (210) is situated between the motor and support block (212) and, with threaded spool (32b) slideably located on drive shaft (34), threaded spool (32b) is threaded through the rifled drive block (210) with pin (209) in slot (208). The drive block divides the threaded spool leaving opposed end portions, one to take up cord, the other to unwind cord when the motor rotates the spool in a clockwise direction, the two ends reversing the function when the motor is reversed.

The slot/pin combination provides rotation to the threaded spool (32b) while still allowing the threaded spool to slide axially as threads (212) of threaded spool (32b) engage the inner walls of the rifled drive block. Moreover, it may be appreciated with reference to FIGS. 8 and 11 that, by locating the cord guide blocks over the threaded spool, rotation of the motor will feed cord into the threads or pick up the cord off of the threads, depending upon whether the motor is rotating clockwise or counterclockwise. That is, one side of threaded spool (32b) will be taking up cord while the other side will be unwinding cord in a manner set forth with the embodiments above. However, this particular alternate preferred embodiment has the additional feature of positively moving the spool axially with each 360° rotation of the spool, generally maintaining the spool beneath the cord guide block holes. It can be appreciated that, as cord winds and unwinds from the spool, the cord is positively separated from adjacent coils of cord by the threads of threaded spool (32b). Guide blocks (40) have guide block holes (40A) either in the side (FIG. 7) or coming out the bottom surface to feed/pick up cord at points adjacent to rifled drive block (210). The removed ends of the cord are attached to the far ends (33) and (35) of the threaded shaft. With cord feed/take-up done adjacent the drive block and the two ends of the cord attached at the far ends of the threaded spool, it is seen that, with the shade in the full down (closed) position, most of the threaded spool will be to one side of the drive block with cord wound up on that side and mostly unwound from the other, and with the shade in the full up (open) position, those positions are switched.

FIG. 8A is an illustration of how a drive shaft mounted pin (209) engages slot (208) of threaded spool (32b) in a manner such that rotation of drive shaft (34) in the first direction will cause, due to interference with threads (212) and rifled drive block (210), the threaded spool to move in a first direction and, when drive shaft (34) is rotated in the opposite direction, threaded spool (32b) will be driven axially in the opposite direction. This will allow for alternately taking up and unwinding the cord, both ends of which are attached to the threaded spool and another portion of which is tied into the shade rail.

FIG. 8B features a slot (208a) which is closed on both ends whereas the slot (208) illustrated in FIG. 8A is closed on one end and open on another. Further, it can be seen that in FIG. 8 a pair of pins are used to maintain proper alignment of the slot with the drive shaft. FIGS. 9A, 9B, and 10 illustrate the manner in which threaded spool (32b) engages drive shaft (34) through the use of slot (208) and pin(s) (209). FIG. 9A is a cross sectional view of the threaded spool through the slot portion. FIG. 9B is a cross sectional view of the threaded spool in a nonslot portion thereof. FIG. 10 illustrates how threaded spool (32b) is mounted on drive shaft (34) with pin (209) and slot (208).

FIG. 11 illustrates an exploded view of the manner in which Applicants' alternate preferred embodiment is assembled. It is seen that fasteners (214), such as rivets, screws, etc., are used to mount motor mount (200) to frame member (16a) other structural means. It is also seen how threaded spool (32b) is slid over drive shaft (34) and pin or pins (209) are set in slot (208). Further, it is seen how cord guide blocks (40) and rifled drive block (210) and support block (212) are mounted to a mounting angle brace or frame member (16a).

FIG. 12 illustrates Applicants' alternate preferred embodiment with some of the remaining components of the window. More specifically, FIG. 12 illustrates motor (30) driving drive shaft (34) on which is rotatably and slideably articulated, threaded spool (32b). Further, it is seen that control module (214), such as that manufactured by Totally Texas Technology of San Antonio, Tex., will cooperate with switches in the electrical system of the aircraft or other vehicle to energize/de-energize and reverse the motor when actuated by the user or when limit switches are activated. Further, it is seen that drive cord (36) is routed around four pulleys, at the corners of the frame herein designated (38a), (38b), (38c), and (38d). These pulleys provide for changing the direction of the cord. It is also seen that the cord may include a spring (220) for maintaining tension therein to help proper routing and activation. Spring (220) is seen here to be mounted adjacent to where drive cord (36) attaches to the shade rail. Frame (12) is used to mount the various components of the system.

It is seen that this or any of the earlier embodiments of Applicants' present invention may be utilized with an alignment mechanism for maintaining shade rail (24) in proper alignment with the frame, in other words, to keep the shade level while it is moved between an open and closed position so it does not get cocked at an angle with respect to the frame.

Here the shade alignment mechanism is comprised of two cords, shade leveling cords (222a) and (222b). They are attached at a first end to the frame and at the second end to shade leveling adjusters (226a) and (226b). Cord (222a) is anchored to the frame in the lower right-hand corner of FIG. 12 and trends vertically upward to shoulder washer (224a) which is attached to the shade rail. Here, cord (222a) makes a 90° corner and passes beneath the portion of the shade rail all the way across it to the left-hand side (as viewed in FIG.

12). Here, cord (222a) is routed vertically upward through a hole (not shown) in the shade rail to the top of the shade where it turns about 90° through plate (223A) and is attached to shade leveling adjuster (226a).

Similarly, cord (222b) is anchored to the frame at the lower left-hand corner thereof as viewed in FIG. 12. It trends vertically upward to shoulder washer (224b) where it is routed across the bottom of a portion of shade rail (24) until it gets to the right-hand side of shade rail (24) whereupon it makes a 90° turn and goes up through a hole (not shown) to the top of the shade through plate (223B) and over to shade leveling adjuster (226b).

The shade leveling adjusters both consist of C-shaped channels (228a) and (228b) into which plates (230a) and (230b) are slideably fit. The plates include a threaded portion to which nuts (232a) and (232b) passes such that when the nut is tightened, it backs out the plate against the arms of the C-channel to hold it tight in place. In this way, plate (230b), when moved to the left as illustrated in FIG. 12, will cause cord (222b) to tighten up. When the proper tension is reached, nut (232b) is tightened. Likewise, plate (230a) may be moved to the right as illustrated in FIG. 12 and nut (232a) tightened to increase the tension in cord (222a). In the manner set forth in the above paragraphs and with respect to FIG. 7, the shade maintains alignment (shade leveling) as it is raised between an upper and a lower position when motor (30) is energized.

Terms such as "left," "right," "up," "down," "bottom," "top," "front," "back," "in," "out," and like are applicable to the embodiments shown and described in conjunction with the drawings. These terms are merely for purposes of description and do not necessarily apply to the position or manner in which the invention may be constructed for use.

Although the invention has been described in connection with the preferred embodiment, it is not intended to limit the invention's particular form set forth, but on the contrary, it is intended to cover such alternatives, modifications, and equivalences that may be included in the spirit and scope of the invention as defined by the appended claims.

What is claimed is:

1. A window for a vehicle having an electrical system, the window having a shade with a shade rail movable between an open and closed position, the shade attached to the shade rail, the shade rail driven by a cord, the cord having a first end and a second end, the cord tied into the shade rail between the two ends, the window comprising:
    an electric motor, the electric motor having a drive shaft attached thereto;
    an elongated cord-receiving spool with the first and the second ends of the cord attached thereto;
    means cooperating with the drive shaft for engaging the elongated cord-receiving spool such that the spool is capable of moving longitudinally with respect to the drive shaft when the electric motor is energized;
    and wherein such longitudinal movement allows the cord to be taken up on the spool without bunching up when the electric motor is energized;
    wherein means cooperating with the drive shaft comprise a threaded spool slideably mounted over the drive shaft and a rifled drive block for receiving the threaded spool therein, wherein energizing the motor causes the drive shaft to rotate and the threaded spool to move longitudinally as threads of the threaded spool interfere with the rifled drive block to move the threaded spool longitudinally while the first end of the cord is taken up in the grooves between the threads of threaded spool and the second end unwinds from the threads of the threaded spool.

2. The window of claim 1, wherein the threaded spool includes walls defining a longitudinal groove therein and wherein the drive shaft includes a pin mounted thereto and dimensioned to engage the threaded spool within the walls of the groove such that rotating the drive shaft will cause the pin to cause the threaded spool to rotate while moving longitudinally over the drive shaft.

3. The window of claim 2 further including cord guide means to simultaneously feed cord onto the threaded spool and pick up cord coming off of the threaded spool when the electric motor is energized.

4. The window of claim 1 wherein the means cooperating with the drive shaft include a spool cage and a slide block, the slide block attached to the spool and engaging the spool cage such that the drive shaft, driving the spool cage, allows the spool to move axially guided by the slide block located within the cage.

5. A window for a vehicle having an electrical system, the window having a shade with a shade rail movable between an open and closed position, the shade attached to the shade rail, the shade rail driven by a cord tied thereto, the cord having a first end and a second end, the window comprising:
    an electric motor having a drive shaft with a pin attached thereto;
    a threaded spool capable of being slideably mounted to the drive shaft, the threaded spool having walls defining a slot therein for engaging the pin of the drive shaft; and
    a rifled drive block for cooperatively engaging the threads of the threaded spool such that, when the motor is energized, the pin rotates the drive shaft, causing the rifled drive block to drive the threaded spool axially, the axial motion allowing the cord to snugly engage the threads of the shaft while it winds from one end and unwinds from the other end of the cord as the window is raised and lowered.

6. A mechanism to raise and lower a window shade in a window having a frame, the mechanism comprising:
    a cable having a first end and a second end, the cable attached to the window shade between the two ends thereof;
    a threaded spool with a first end portion and a second end portion, the two end portions opposite one another and with a central portion therebetween;
    a threaded drive block attached to the frame and engaging the central portion of the threaded spool; and
    drive and feed means for rotating the threaded spool while allowing the threaded spool to slide axially, wherein the first end of the cable is attached to the first end portion of the threaded spool and the second end of the cable is attached to the second end portion of the threaded spool, for rotating the threaded spool causing axial sliding while allowing the cord to unwind from the threads of one of the two ends while it is taken up on the threads of the other of the two ends wherein the threaded spool is nylon and wherein the drive and feed means include a nylon shaft for engaging the threaded spool and further wherein the threaded spool includes walls defining a slot and the drive shaft includes a pin engaging the slot wherein, when the motor is energized, the pin causes the threaded spool to rotate and move axially with respect to the drive shaft, taking up cord on one end of the threaded spool and unwinding it from the other end.

* * * * *